April 10, 1956     J. R. MOORE     2,741,742

METHOD AND MEANS FOR DETERMINING RANGE

Filed Nov. 28, 1942     2 Sheets-Sheet 1

INVENTOR.
JAMES R. MOORE
BY
*Harry M. Saragovitz*
ATTORNEY

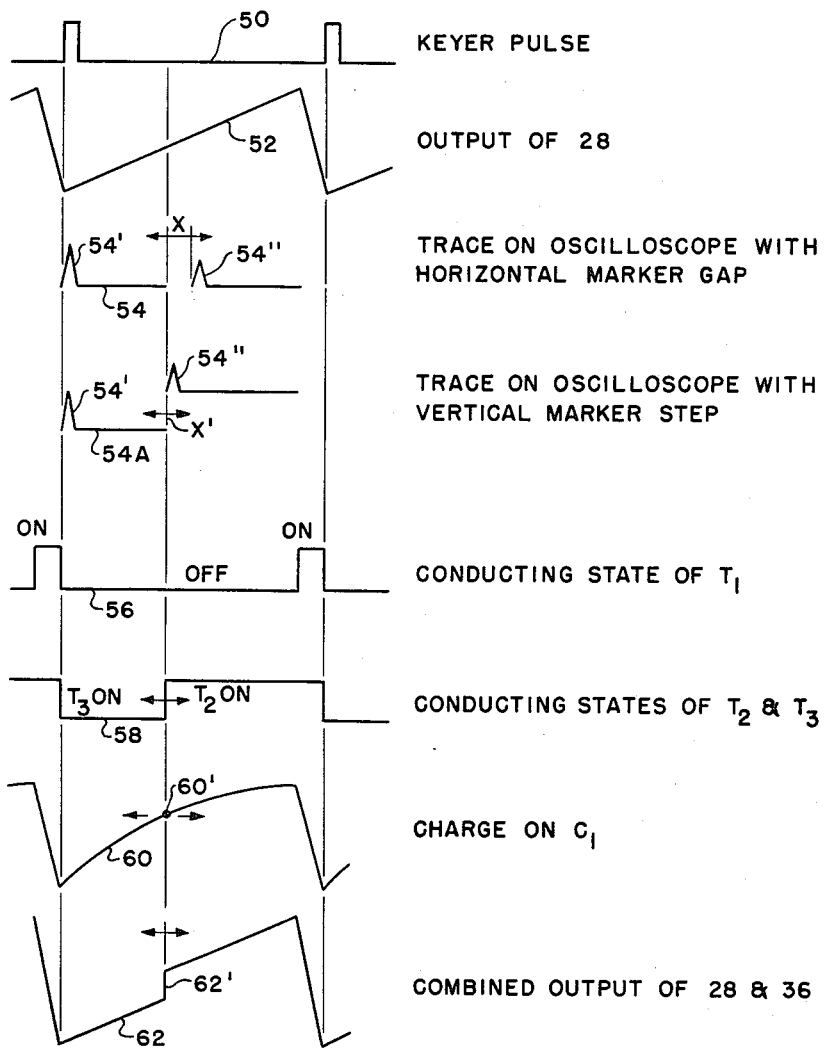

2,741,742

METHOD AND MEANS FOR DETERMINING RANGE

James R. Moore, Rumson, N. J., assignor to the United States of America as represented by the Secretary of War Application November 28, 1942, Serial No. 467,261

6 Claims. (Cl. 324—68)

(Granted under Title 35, U. S. Code (1952), sec. 266)

The invention described herein may be manufactured and used by or for the Government for governmental purposes, without the payment to me of any royalty thereon.

My present invention relates to a method and means for measuring distance, particularly, though not exclusively, the distance between aircraft and a detecting station.

The object of the present invention is to provide a device of the general character indicated which is simple in construction, easy and economical to manufacture and assemble, and accurate in the performance of its function.

In the accompanying specification I describe and in the annexed drawings I show an illustrative embodiment of the present invention.

In the accompanying drawings:

Fig. 3 is a series of wave-forms illustrating the operation of the system in Figs. 1 and 2.

Figure 1:
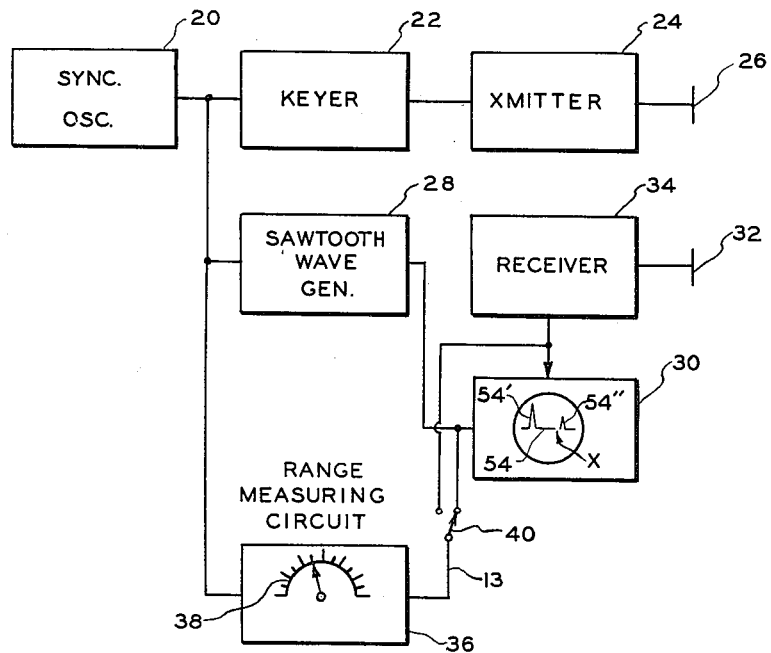
Fig. 1 is a block diagram of my invention as applied to a conventional pulse-echo detection system.

Referring now particularly to Figs. 1 and 3, a sine wave synchronizing oscillator 20, although oscillators generating other types of waves may be used, generates a constant frequency wave, usually in the audio frequency region. This wave is applied to a keyer 22 which generates a sharp positive pulse at each cycle of said sine wave, such as shown by waveform 50 in Fig. 3, the duration of said pulse being extremely short relative to the period of said wave. The pulses 50 are then applied to a normally blocked transmitter 24 which, for the duration of pulse from the keyer, generates a pulse in the form of a train of oscillations which are radiated, preferably through a highly directional antenna indicated at 26.

Synchronizing oscillator 20 also controls the operation of a sawtooth wave generator 28 which generates a sawtooth wave 52 synchronized with the transmitted pulses. This wave is applied to the horizontal deflecting circuit of an oscilloscope 30 to provide a horizontal trace constituting the time base of the oscilloscope.

The pulses radiated from antenna 26, commonly designated the main pulses, as well as echoes of said pulses from a reflecting target are picked up by an antenna 32 and detected by a receiver 34, the output of which is applied to the vertical deflecting circuit of the oscilloscope 30. The main pulses and the echoes thereof serve to vertically deflect the horizontal trace of the oscilloscope and provide horizontally spaced deflections, or "pips" 54' and 54", the spacing therebetween depending upon the relative timing thereof, and hence the range of the reflecting target.

As thus far described the system is conventional. In accordance with my invention an adjustable, calibrated timing or range measuring circuit 36, synchronized by generator 20 is provided to generate spaced marker pulses which are variable in timing relative to the main pulses and impressed upon the oscilloscope deflecting means to provide a movable marker indication upon the time base. When said marker indication is moved into registry with the echo pip, usually the leading edge of said pip, the range reading is provided by a scale 38.

The output of circuit 36 is applied over a lead 13 and a two position switch 40 to either the vertical or horizontal deflecting circuit of the oscilloscope. When applied to the horizontal deflecting circuit the marker takes the form of a gap X on the time base 54, as shown in Figs. 1 and 3, which is moved into registry with the leading edge of the echo pip 54" as shown. When applied to the vertical deflecting circuit, the marker takes the form of a vertical step X' in the time base 54A which is moved into registry with the leading edge of the echo indication 54", as shown in Fig. 3.

Figure 2:
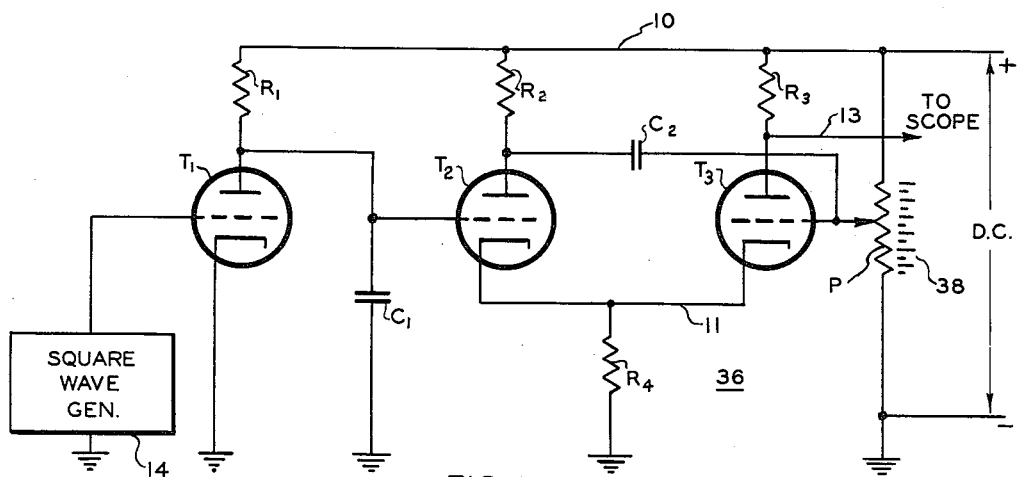
Fig. 2 is a schematic circuit diagram of the range-measuring circuit in Fig. 1.

References is now made to Fig. 2 which shows a detailed circuit diagram of an illustrative embodiment of the range measuring circuit 38. The latter comprises a plurality, here shown as three, of vacuum tubes of the triode type, designated as $T_1$, $T_2$, and $T_3$, said tubes being hereinafter respectively referred to, in accordance with their functions, as switching, trigger, and timing tubes. In the interest of simplicity, a showing of the filaments of these tubes has been omitted from the drawings. By means of a common conductor 10, the plates or anodes of the tubes $T_1$, $T_2$, and $T_3$ are respectively connected through resistors $R_1$, $R_2$, and $R_3$ to the positive side of a source of D. C. voltage, the negative side thereof being grounded as shown.

The cathode of the switching tube $T_1$ is grounded directly and the cathodes of the trigger and timing tubes $T_2$ and $T_3$ are connected by a common conductor 11 and then grounded through the resistor $R_4$.

The grid of the switching tube $T_1$ is connected with a source 14 of square wave voltage which is synchronized with and is of the same frequency as the voltage of oscillator 20.

The plate end of the resistor $R_1$ is connected by a conductor to a capacitance $C_1$, this capacitance, together with said resistor $R_1$, constituting an R-C circuit the time constant of which corresponds to the pulse and sweep frequency. Connected into the R-C circuit, at the junction of the resistor and condenser thereof, is the grid of the trigger tube $T_2$.

The grid of the timing tube $T_3$ is connected, through another capacitance $C_2$, to the lower potential end of the resistor $R_2$ and the same grid is also connected to the adjustable contact arm of a potentiometer P shunted across the D. C. plate voltage supply.

The potentiometer P may comprise either a plurality of exponentially related resistors, taps to which are selectively engageable by the adjustable contact arm or a single linear resistance slidably engageable by the contact arm. If the former, the potentiometer scale should be linearly calibrated and if the latter, said scale should be exponentially calibrated.

The output of the circuit in Fig. 2 comprises a conductor 13 connected between the lower potential end of the resistor $R_3$ and the horizontal or the vertical deflecting circuit of oscilloscope 30.

This completes the description of the range measuring circuit of the present invention and the mode of operation thereof, together with a description of the method of the present invention is as follows:

A saw-tooth wave, such as is shown at 52 in Figure 3 of the drawings, is applied to the horizontal plates of the oscilloscope to produce a substantially linear base line corresponding to the frequency of the pulse transmitter and therefore to a certain equivalent time-distance, the re-trace time of the electron beam of the oscilloscope being exceedingly short compared with the main trace.

A square wave, such as is shown at 56 in Figure 3 of the drawings, is impressed upon the grid of the switching tube $T_1$ by pulse generator 14, the long negative portion of said wave maintaining said tube at cut-off and the short positive portion thereof causing said tube to become conducting. It is to be assumed that cut-off is the reference point for purposes of this explanation. The circuit arrangements are such that the beginning of the non-conducting period coincides with the transmission of a pulse by the pulse-echo detection system hereinbefore referred to.

At the start of the cut-off or non-conducting period of the switching tube $T_1$ the relationship of the operation of the trigger and timing tube $T_2$ and $T_3$ is as shown at 58 in Figure 3 of the drawings. Through adjustment of the potentiometer P the voltage applied to the grid of the timing tube $T_3$ is such that said tube is conducting. As a result, the current flowing through the resistor $R_4$ biases the trigger tube $T_2$ to cut-off and the voltage conveyed to the oscilloscope through the conductor 13 has a certain steady D. C. value.

With the switching tube $T_1$ non-conducting, the D. C. "B" voltage charges the capacitance $C_1$ in accordance with the exponential curve 60 shown in Figure 3 of the drawings. When the charge attains a value sufficient to overcome the cut-off bias on the grid of the trigger tube $T_2$, say at point 60' of curve 60, said tube will conduct and as a result, the current flowing through the resistor $R_4$ will be increased and the voltage drop across the same will be increased. This will urge the cathode of the timing tube $T_3$ less negative with respect to the plate of said tube and this will tend to reduce the current being conducted by said tube. At the same time, the flow of current through the resistor $R_2$ will increase, as will the voltage drop across said resistance. This will, through the capacitance $C_2$, reduce the potential on the grid of the timing tube $T_3$. The combined action of the less negative cathode and the more negative grid will result in the cutting off of the timing tube $T_3$. As a result of the latter action the plate potential on the timing tube $T_3$ will increase and his increase will be conveyed, in the form of a sudden surge of voltage, through the conductor 13 to the oscilloscope.

In the meantime, it is to be noted, the capacitance $C_1$ is continuing to charge.

The sudden surge of voltage through the conductor 13 to the oscilloscope may, as already indicated, be applied either to the horizontal or the vertical plates. When applied to the horizontal deflecting circuit, the surge of voltage combines with wave 52 to form a wave 62 which is greatly accelerated at the time of occurrence of said surge, as shown at 62'. In either case it results in a sudden speeding up of the movement of the electron beam, the burst of speed not being visible on the trace of the oscilloscope and therefore resulting in a horizontal gap or vertical displacement in the base line. This is designated by the reference characters X and X' in curves 54 and 54A. If this surge of voltage is applied to the horizontal plates of the oscilloscope, there will be a horizontal gap in the base line co-extensive with the duration of the surge and if this surge of voltage is applied to the vertical plates of the scope there will be a vertical displacement of the base line commencing with the time of occurrence of the surge instead of the horizontal gap. Inasmuch as the moment of the appearance of the gap or vertical displacement is dependent upon the operation of the trigger tube $T_2$ and this, in turn, is dependent upon the voltage applied to the grid of the timing tube $T_3$ through the potentiometer P and the R-C time constant, the space separating the trace of the main pulse of the transmitter and the gap or vertical displacement of the base line is a measure of distance.

By varying the voltage on the grid of the timing tube $T_3$, through the potentiometer P, the time of the appearance of the gap can be adjusted to coincide with the vertical displacement of the electron beam corresponding to the reflected echo, as shown at X or $X^1$ in curves 54 and 54A. Therefore, the bias voltage on the grid of the timing tube $T_3$ becomes a measure of distance and the potentiometer scale may be directly calibrated in terms of distance.

The circuit is made ready for the next cycle of operations by the positive portion of the square wave acting upon the grid of the switching tube $T_1$ to make said tube conducting and so discharge the capacitance $C_1$, the latter action reducing the potential on the grid of the trigger tube $T_2$ and rendering the same non-conducting.

This completes the description of the mode of operation and use of the present invention and it will be noted from all of the foregoing that I have presented a simple, efficient and accurate method and means for measuring distance or determining range. Other objects and advantages of the present invention will be obvious to those skilled in the art to which the present invention relates.

While I have described herein the preferred form of my present invention it is to be clearly understood that I do not wish to be limited to the exact details thereof, herein shown and described for purposes of illustration only, inasmuch as changes therein may be made without the exercise of invention and within the scope of the claims hereto appended.

I claim:

1. An electron tube circuit comprising a switching electronic tube having a resistance-capacitance network in the plate circuit thereof, a triggering electronic tube coupled to said network, a timing electronic tube coupled to said triggering tube in a manner whereby the flow of current through said triggering tube biases said timing tube to cut off, the cathodes of said triggering and timing tubes being grounded through a common resistor whereby the flow of current through said timing tube biases said triggering tube to cut-off, means to adjust the bias on said timing tube to control the time required by said network to overcome the cut-off bias on said triggering tube, and a regenerative feedback circuit coupling said triggering and timing tubes to accelerate the cutoff action thereof.

2. Means for measuring the time displacement between a first and second pulse comprising an oscilloscope indicator having vertical deflection means and horizontal deflection means, means for generating a sweep voltage in synchronism with said second pulse, means for applying said sweep voltage to said horizontal deflection means to establish a time base on said indicator, and means for applying said pulses to said vertical deflection means to present said pulses as spaced vertical displacements along said time base, means for generating an electrical impulse in synchronism with said first pulse, means for applying said electrical impulse to said horizontal deflection means to momentarily accelerate said time base whereby a gap is formed in said time base, and means for varying the time position of said electrical impulse until it coincides with said first pulse, said last named means being calibrated to indicate said time displacement at the point of coincidence along said time base between said gap and said first pulse.

3. The method of determining the time relation of a first series of recurrent pulses relative to a second series of recurrent pulses, both of said series having the same repetition frequency, comprising generating an indicating beam, generating sawtooth waves in synchronism with said second series of pulses, periodically sweeping said beam linearly with said sawtooth waves, deflecting said beam from its path with said first series of pulses to provide an indication thereof at a point dependent upon the relative timing thereof, generating third series of pulses when said sawtooth waves reach a given potential, producing in response to said third series a marker on the path of said beam by momentarily accelerating the sweep of said beam, and producing a measured variation in said given potential to produce coincidence of said marker pulse and the indication of said first series of pulses, at which time the measure of said variation indicates said time relation.

4. A time measuring system comprising a source of electromotive force, a potentiometer and a timing circuit connected in parallel with each other and with said source of electromotive force, said timing circuit consisting of a resistor and a condenser each of fixed valve, means to select a variable intermediate point in said potentiometer, and means to indicate the potential difference between the selected point in said potentiometer and a fixed point in said timing circuit.

5. Apparatus comprising a source of electromotive force, a timing circuit and a potentiometer connected with said source of electromotive force, said timing circuit having a given characteristic relationship between voltage and time, said potentiometer having a movable contactor and a scale for indicating the setting of said movable contactor, and said potentiometer having the same characteristic relationship between voltage and the indication of said scale as given between voltage and time for the said timing circuit, whereby non-linearity of said characteristic relationship is compensated in relating the scale indication to the time.

6. In combination with a cathode ray tube having a beam deflecting means, a time base generating circuit comprising means for generating a sawtooth wave, means impressing said wave upon said deflecting means to provide a time base on the screen of said tube, means synchronized with said sawtooth wave for generating periodic pulses having a shorter duration and a faster rate of rise than each cycle of said sawtooth wave, means impressing said pulses upon said deflecting means to momentarily increase the speed of said beam during each traverse thereof across said screen, and means to vary the phase relation between said sawtooth wave and said pulses.

References Cited in the file of this patent

UNITED STATES PATENTS

| | | |
|---|---|---|
| 2,143,035 | Smith | Jan. 10, 1939 |
| 2,225,046 | Hunter | Dec. 17, 1940 |
| 2,230,926 | Bingley | Feb. 4, 1941 |
| 2,258,752 | Fewings et al. | Oct. 14, 1941 |
| 2,301,869 | Hammond | Nov. 10, 1942 |
| 2,407,294 | Shockley et al. | Sept. 10, 1946 |
| 2,416,088 | Deerhake | Feb. 18, 1947 |